Sheet 1 - 2 Sheets.
L. Van Hoesen, Jr.
Forming Bats.
No. 5541X
Patented Jun. 19, 1829.
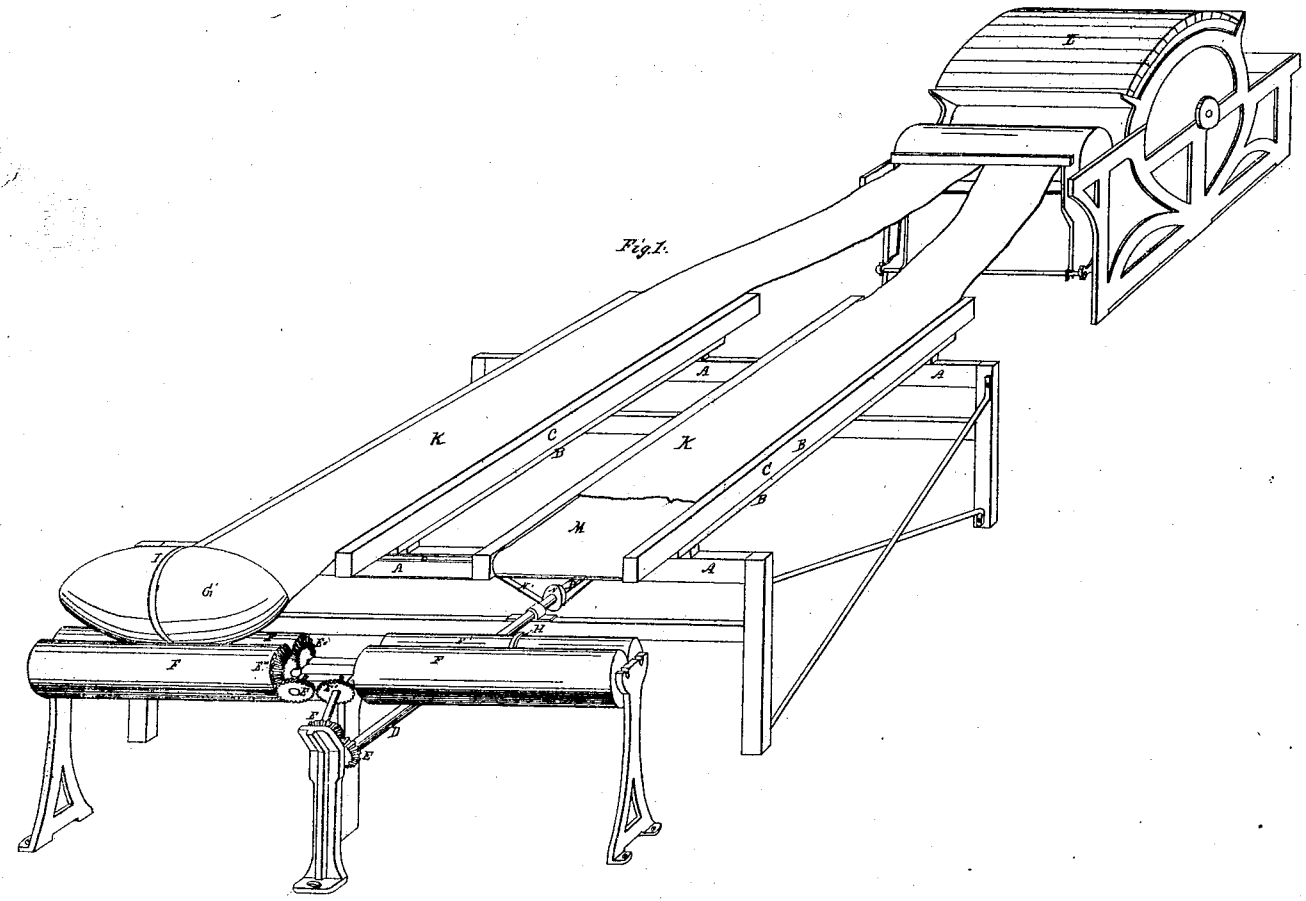

5541X
Sheet 2-2 Sheets
L. Van Hoesen Jr.
Forming Bats.
Patented Jun. 19, 1829.
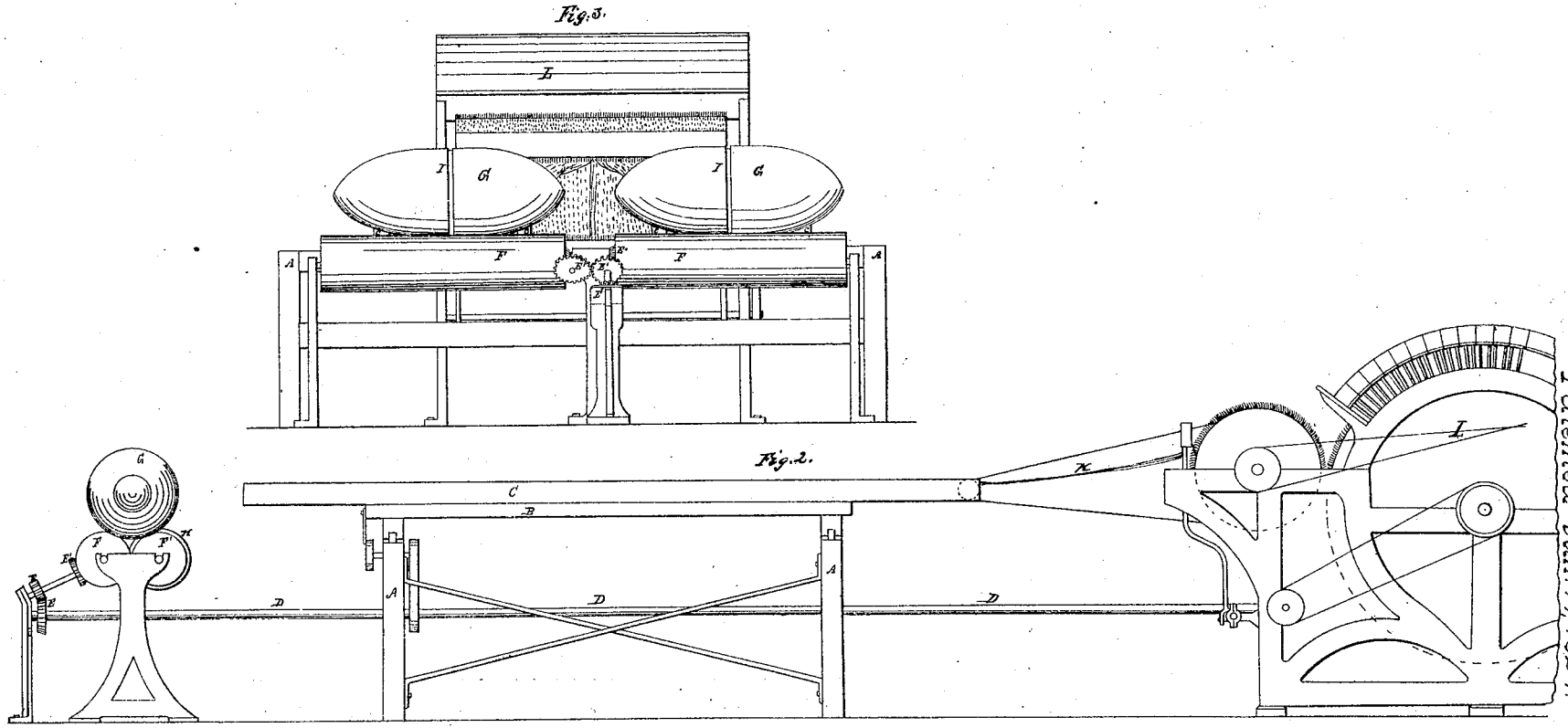

United States Patent Office

PTO - BOYERS, PA Duty Station

MISSING PAGE TEMPORARY NOTICE

PATENT # 5541X FOR ISSUE DATE 6-19-1829 HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All Text

Data Conversion Operation

Boyers, Pa